H. B. SMITH.
Wheel Cultivator.

No 39,760. Patented Sept. 1, 1863.

Witnesses:
J. W. Coombs
G. W. Reed

Inventor:
H. B. Smith
per Munn & Co.
attorneys.

UNITED STATES PATENT OFFICE.

H. B. SMITH, OF EUREKA, ILLINOIS.

IMPROVEMENT IN CULTIVATORS.

Specification forming part of Letters Patent No. 39,760, dated September 1, 1863.

*To all whom it may concern:*

Be it known that I, H. B. SMITH, of Eureka, in the county of Woodford and State of Illinois, have invented a new and Improved Cultivator; and I do hereby declare that the following is a full, clear, and exact description of the same, reference being had to the accompanying drawings, making a part of this specification, in which—

Figure 1:
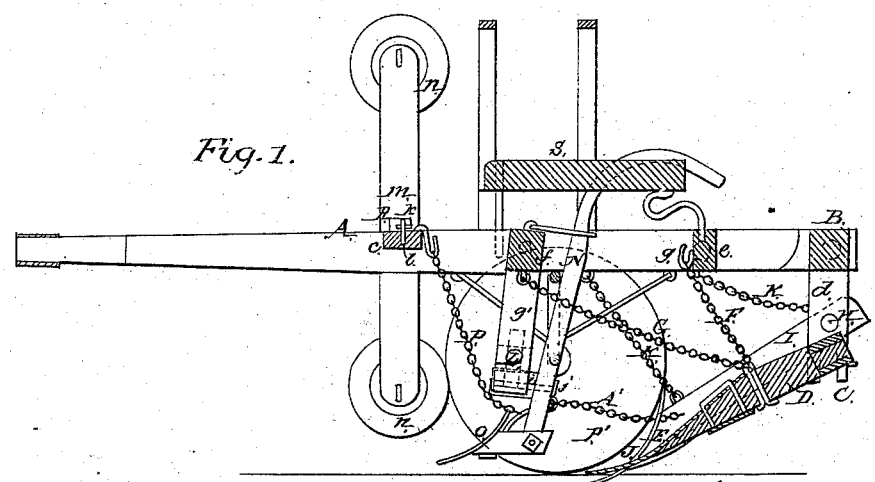
Figure 3:
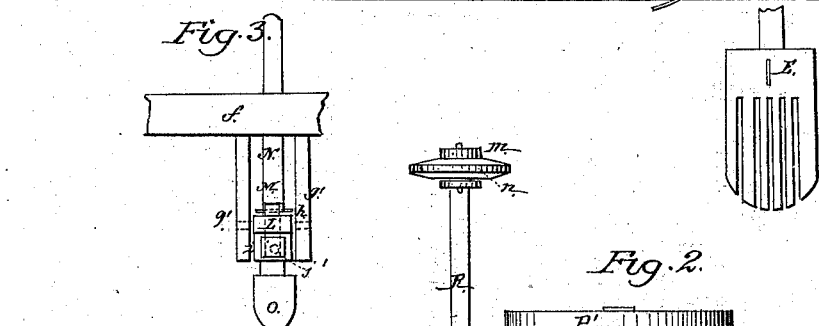
Figure 2:
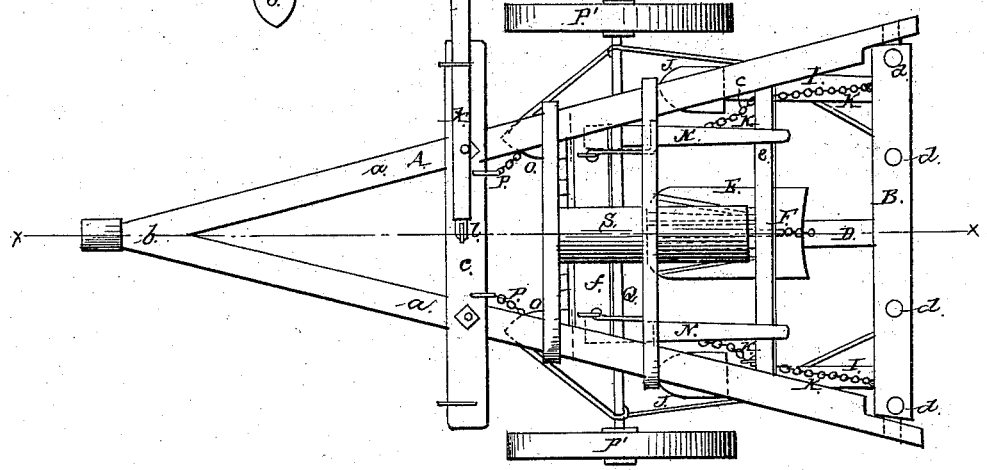

Figure 1 is a side sectional view of my invention, taken in the line $x$ $x$, Fig. 2. Fig. 2 is a plan or top view of the same; Fig. 3, a detached front view of one of the plows appertaining to the same.

Similar letters of reference indicate corresponding parts in the several figures.

This invention consists in the employment or use of a series of plows attached to a frame and arranged in such a manner as to enable the operator to impart at will an up-and-down movement to all the plows by the handles which he controls—that is to say, to lower the plows a sufficient depth into the earth and also to elevate them above the surface, so as to prevent them from catching into the earth when not desired; and, also, in addition to that motion, the giving of the front plows, by manipulating the handles, an inclined position from or toward the row, so as to enable the operator to cause the earth to be stirred close up to the hills at both sides and without covering the plants.

To enable those skilled in the art to fully understand and construct my invention, I will proceed to describe it.

A represents a frame, which is of V form, its side bars, $a$ $a$, being connected together at their front ends, as shown at $b$, and diverging therefrom and connected at a point near their centers by a transverse bar, $c$, as shown in Fig. 2. Between the back parts of the bars $a$ $a$ a shaft, B, is fitted, the journals of which are allowed to turn or work freely in the bars $a$ $a$, and this shaft is provided with pendants $d$, four in number, the upper ends of which are shown in Fig. 2, as they pass entirely through the shaft B.

Between the two central pendants, $d$ $d$, there is fitted a shaft, C, to which a bar, D, is attached, having a toothed share, E, of rake form, secured to it. This share may be raised or lowered, so as to penetrate into the earth to a greater or less depth as desired, by adjusting a chain, F, one end of which is attached to the bar D and the opposite end to a transverse bar, $e$, of the frame A. Another chain, G, may also be attached at one end to the bar D and its opposite end secured to a transverse shaft, $f$, in the frame A. These chains are adjusted by simply taking them up or letting them out from hooks $g$. (See Fig. 1.)

Between the end pendants, $d$, and the central ones there are fitted shafts H H, which also have bars I attached to them, one to each. These bars have plows J, of shovel form, secured to the lower ends, and they may be adjusted higher or lower, or at a greater or less inclination, to regulate the depth of their penetration into the earth, by chains K, arranged similar to the chains F G of the bar D.

The plows J, it will be seen, may be adjusted separately, as they are connected to separate shafts C H H, which are allowed to turn freely in their bearings, and both the plows J and rake-share E may be raised simultaneously by turning the shaft B, which, like the shafts C H H, are retained in proper position or prevented from casually turning while the plows are at work by the chains F, G, and K.

The shaft $f$, like the shaft B, is allowed to turn in the frame A, and to it there are attached two pairs of pendants, $g'$, one pair being shown in Fig. 3. Between the two pendants which form each pair there is placed a shaft, L. These shafts are allowed to turn freely between the pendants, and through each shaft a vertical rod, M, passes and is secured by a pin, $h$. These rods M are provided with hubs $i$ at their lower ends, to which curved bars N N are secured, one to each, and are designed to serve as plow-handles. These handles are secured to the hubs $i$ by pivots $j$, which admit of a lateral swinging movement of the handles, and the shafts L admit of a forward and backward swinging movement of the same.

The plows O, which are attached to the lower ends of the handles N, are of the usual shovel form, and the handles are retained in proper position or prevented from casually turning by means of chains P, which are attached to the handles N and to the traverse-bar $c$. This arrangement of the handles N N admit of the plows O being moved laterally or adjusted forward and backward, as desired, and in plowing crops in hills or drills the plows may be adjusted relatively with the plants as the nature of the work may require, either in close proximity to them or at some distance from them, and the weeds, also, between the rows may be thoroughly eradicated.

In plowing corn or other crops the back plows may be elevated above the surface of the ground by taking up the chains F, G, and K, or all the plows may be allowed to penetrate into the earth, if desired, and this may be necessary in many cases for the perfect eradication of weeds or the pulverizing of the soil. But it is necessary to elevate the back plows as well as the front ones in turning at the ends of rows, so that all the plows may be above the surface of the ground, and this is done by bearing down on the upper ends of the handles N, a connection formed by chains A between the plows O and J admitting of this result, and when the device is again ready for operation the handles are elevated to nearly a vertical position and the plows descend to their proper position in the earth.

In digging potatoes the back plows are elevated, the rake-share E being lowered, and also the front plows, O, the machine being drawn along, so that said share will work in line with the rows and a plow, O, at each side of them.

I design to have the frame A permanently mounted on wheels P', so that the latter may support the machine and render the plows free from the weight of the same, so that they may readily perform the work required of them. In furrowing I design to have a marker, R, placed on the frame A, said marker being composed of a rod, $k$, attached at its inner end to the center of the traverse-bar $c$ by a joint, $l$, so that said bar may be adjusted to either side of the machine. The rod $k$ has a bar, $m$, attached to it at right angles with a wheel, $n$, at each end of it, and these wheels mark the ground to serve as a guide for the team, an animal walking at each side of the mark. In mellow ground the wheels will furrow the ground, as they will sink into it sufficiently deep for that purpose; but when the earth is too hard to admit of this the back plows, J, are used for the purpose. This marker, however, is not new, it having been previously used on various machines of this class. On the frame A a driver's seat, S, is placed.

This machine may be constructed at a very reasonable cost, and may be adapted to all the different kinds of work required in cultivating crops grown in hills or drills. There are no parts liable to get out of repair. A farmer may keep it in perfect working order until it is entirely worn out.

I do not claim the marker R, for that is an old and well-known device; nor do I claim broadly adjustable plows, or those having a lateral adjusting movement, irrespective of the arrangement of the same or means employed for effecting that result; but,

Having thus described my invention, what I claim as new, and desire to secure by Letters Patent, is—

1. The pivoting of the plow-handles N N to rods M, fitted vertically and loosely in shafts L, which are allowed to turn in their bearings in pendants $g'$, attached to a shaft, $f$, which is also allowed to turn in its bearings, all being arranged, as shown, to admit of the adjustment of the plows O, as and for the purpose set forth.

2. The plows J and rake-share E, attached to separate or independent shafts H H C, which are fitted loosely between pendants $d$, connected to a shaft, B, that turns loosely in its bearings in the frame A of the machine, as and for the purpose set forth.

3. In combination with the plows O O J J and rake-share E, arranged as shown, the adjusting-chains F G K and A' P, applied in the manner as and for the purpose specified.

H. B. SMITH.

Witnesses:
H. C. BAIRD,
N. D. BAIRD.